US006703479B1

(12) United States Patent
McGehee et al.

(10) Patent No.: US 6,703,479 B1
(45) Date of Patent: Mar. 9, 2004

(54) PROCESS AND APPARATUS FOR COOLING POLYMER IN A REACTOR

(75) Inventors: James F. McGehee, Milan (IT); Giuseppina R. Boveri, Tortona (IT); Paul A. Sechrist, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 197 days.

(21) Appl. No.: 10/011,334

(22) Filed: Dec. 3, 2001

(51) Int. Cl.[7] .............................. C08F 6/00; B01D 9/00
(52) U.S. Cl. .................... 528/503; 528/492; 422/245.1; 422/251; 422/253
(58) Field of Search ................. 528/492, 503; 422/245.1, 251, 253

(56) References Cited

U.S. PATENT DOCUMENTS

| | | | |
|---|---|---|---|
| 3,227,527 A | 1/1966 | Heinze et al. | 23/288 |
| 4,064,112 A | 12/1977 | Rothe et al. | 260/75 M |
| 4,255,542 A | 3/1981 | Brown et al. | 526/88 |
| 4,460,762 A | 7/1984 | Gaymans et al. | 528/335 |
| 5,540,868 A | 7/1996 | Stouffer et al. | 264/13 |
| 5,547,652 A | 8/1996 | Ghisolfi et al. | 423/245.3 |
| 5,612,011 A | 3/1997 | Ghisolfi et al. | 423/245.3 |
| 5,633,018 A | 5/1997 | Stouffer et al. | 425/8 |
| 5,662,870 A | 9/1997 | Walsh | 422/245.1 |
| 5,708,124 A | 1/1998 | Al Ghatta et al. | 528/308.3 |
| 5,744,074 A | 4/1998 | Stouffer et al. | 264/8 |
| 5,817,747 A | 10/1998 | Giordano et al. | 528/503 |

FOREIGN PATENT DOCUMENTS

JP  5-253468  10/1993

OTHER PUBLICATIONS

Article "Nylon 6 Polymerization in the Solid State" by R.J. Gaymans et al, *Journal of Applied Polymer Science*, vol. 27, 2513–2526 (1982).
Thesis "Impianto di Postpolicondensazione di Polietilentereftalato" G. Ghisolfi (1984–85).
Presentation "Advanced PET Bottle–to–Bottle Recycling" by A. Christel, Polyester 2000 World Congress, Nov. 28–Dec. 1, 2000, Zurich, Switzerland.

*Primary Examiner*—Samuel A. Acquah
(74) *Attorney, Agent, or Firm*—John G. Tolomei; James C. Paschall (57) ABSTRACT

A process and apparatus is disclosed for heating or cooling polymer solids in a dispensing section of a solid-state polycondensation reactor. Gas is delivered to the dispensing section of the reactor in which it cools polymer solids in the dispensing section by direct heat exchange. Part of the gas is withdrawn at a point proximate to the dispensing section of the reactor and is cooled. The rest of the gas ascends through a reactive section of the reactor and purges polymer solids of impurities. The gas withdrawn from the reactive section of the reactor is oxidized of impurities and dried and then combined with the gas withdrawn proximate to the dispensing section of the reactor. To achieve uniform heating or cooling of the polymer solids in the dispensing section, a preferred ratio of mass flow rate of gas to the mass flow rate of solids is recommended.

20 Claims, 4 Drawing Sheets

PROCESS AND APPARATUS FOR COOLING POLYMER IN A REACTOR

FIELD OF THE INVENTION

The present invention relates to a process for cooling or heating polymer in a polymerization reactor. The invention specifically relates to cooling polymerized solids in a polycondensation reactor. The invention particularly relates to cooling polyester, polyamide or polycarbonate chips in a solid-state polycondensation (SSP) reactor.

BACKGROUND OF THE INVENTION

Polymer resins are molded into a variety of useful products. One such polymer resin is polyethylene terephthalate (PET) resin. It is well known that aromatic polyester resins, particularly PET, copolymers of terephthalic acid with lower proportions of isophthalic acid and polybutylene terephthalate are used in the production of beverage containers, films, fibers, packages and tire cord. U.S. Pat. No. 4,064,112 B1 discloses a solid-state polycondensation or polymerization (SSP) process for the production of PET resins.

While for fibers and films the intrinsic viscosity of the resin must generally be between 0.6 and 0.75 dl/g, higher values are necessary for molding materials such as containers and tire cord. Higher intrinsic viscosity such as greater than 0.75 dl/g can only with difficulty be obtained directly through polycondensation of molten PET, commonly called the melt phase process. The SSP process pushes polymerization to a higher degree thereby increasing the molecular weight of the polymer by the heating and removal of reaction products. The polymer with higher molecular weight has greater mechanical strength and other properties useful for production of containers, fibers and films, for example.

The SSP process starts with polymer chips that are in an amorphous state. U.S. Pat. No. 4,064,112 B1 teaches crystallizing and heating the chips in a crystallizer vessel under agitation to a density of 1.403 to 1.415 g/cm$^3$ and a temperature ranging between 230° and 245° C. (446° and 473° F.) before entering into the SSP reactor. Otherwise the tacky chips tend to stick together.

The SSP reactor may consist of a cylindrical reactive section containing a vertical mobile bed into which the polymer chips are introduced from above and a frusto-conical portion of a dispensing section at the base for dispensing the product chips. The polycondensation reactor typically operates at temperatures between 210°. and 220° C. (410° and 428° F.).

The polyester chips move through the cylindrical reactive section of the polycondensation reactor by gravity in plug-flow. However, when the chips enter the frusto-conical portion of the dispensing section at the base of the polycondensation reactor, they enter into a non-flat velocity profile which interjects a non-uniformity in the amount of time that the chips are in the polycondensation reactor. Accordingly, a chip-to-chip variation in the degree of polymerization occurs due to the variation in residence time. Moreover, at the transition from the cylinder to the cone, the chips are subjected to a consolidation pressure that may be several times the normal radial axial pressure to which the chip had previously been subjected. The chips that are in a glassy region have a strong sticking tendency. Hence, the consolidation pressure can cause lumping of chips and interruption of flow.

Various reactions occur during polycondensation of PET. The main reaction that increases the molecular weight of PET is the elimination of the ethylene glycol group:

PET—COO—CH$_2$—CH$_2$—OH+HO—CH$_2$—CH$_2$—OOC—PET→PET—COO—CH$_2$—CH$_2$—OOC—PET+HO—CH$_2$—CH$_2$—OH

Inert gas such as nitrogen is introduced into the crystallizer vessel and the polycondensation reactor to strip the developing polymer of volatile impurities generated by the polycondensation reaction. Impurities include ethylene glycol and acetaldehyde if PET is produced. U.S. Pat. No. 5,708,124 B1 discloses maintaining the ratio of the mass flow rate of inert gas to the mass flow rate of PET polymer solids to below 0.6 in an SSP reactor.

The conventional method used for the purification of an inert gaseous stream recycled from an SSP process includes an oxidation step for converting the organic impurities to CO$_2$ and a drying step to eliminate the water formed in the polymerization process and the oxidation step. The oxidation step is carried out with gas containing oxygen by using an oxygen concentration of no more than in slight excess of the stoichiometric quantity with respect to the organic impurities. The oxidation step is controlled according to U.S. Pat. No. 5,612,011 B1 so that the inert gaseous stream at the outlet contains an oxygen concentration of not more than 250 ppm and preferably according to U.S. Pat. No. 5,547,652 B1 so that the inert gaseous stream at the outlet contains an oxygen concentration of not more than 10 ppm. These patents taught that a previously required deoxidation step of reducing the oxygen with hydrogen between the oxidation and drying steps was not required. Typically, the inert gaseous stream must be heated before it is recycled to the polycondensation reactor requiring additional utility cost.

It is also well known that polyamide resins, and among them particularly PA6, PA6,6, PA11, PA12 and their copolymers, find wide application both in the fiber and flexible packaging sectors, and in the manufactured articles production by blow and extrusion technology. While the resin relative viscosity for fibers is low at about 2.4 to 3.0, higher relative viscosities of 3.2 to 5.0 are needed for articles produced by blow and extrusion technologies. The relative viscosity is increased to above 3.0 by means of an SSP process operating at temperatures of between 140° and 230° C. (284° and 446° F.), depending on the polyamide types used. U.S. Pat. No. 4,460,762 B1 describes an SSP process for a polyamide and different methods to accelerate this reaction.

An SSP process for polyamide resins is also described in the article "Nylon 6 Polymerization in the Solid State," R. J. Gaymans et al., *Journal of Applied Polymer Science*, Vol. 27, 2515–2526 (1982) which points out the use of nitrogen as a heating and flushing aid. The reaction is carried out at 145° C. (293° F.).

It is also known that the molecular weight of polycarbonate can be increased through an SSP process.

The polymer chips exiting from an SSP reactor must be cooled to below the glass transition temperature for packaging purposes, especially to avoid heat damage to packaging containers, such as sacks and boxes. The desired packaging temperature is below 80° C. (176° F.) for PET chips. U.S. Pat. No. 5,817,747 B1 teaches two-stage cooling of the polymer chips after exiting the polycondensation reactor. The first cooling stage is a bed fluidized with nitrogen used for purging impurities from the SSP process after the nitrogen has been purified. The fluidizing gas entrains and separates the polymer dust from the polymer chips while cooling them to 160° to 180° C. (320° to 356° F.). The polymer dust is formed in the processing apparatuses by the action of rotating parts of an agitator in contact with the polymer chips in the crystallizer vessel and the sliding friction between the chips and the walls of the polycondensation reactor. The second cooling stage is a shell and tube or wall-type heat exchange cooler which uses water as the cooling fluid to cool the chips to between 40° and 60° C. (104° and 140° F.).

U.S. Pat. No. 5,662,870 B1 discloses a fluidized bed with two chambers for cooling polymer chips exiting the SSP reactor in a single stage. Fluidizing gas from the hotter chamber into which hot chips enter from the SSP reactor is recycled to heat the SSP reactor after it is de-dusted through a cyclone. Fluidizing gas from the cooler chamber is also de-dusted through a cyclone and recycled to the fluidizing bed. The amount of dust collected in the fluidizing gas from a fluidized bed is significant and must be removed.

JP 5-253468 A1 teaches introducing a nitrogen gas into a vessel surrounding a dispensing cone at the bottom of a reaction chamber to indirectly cool a product, solid-gas mixture in the cone without causing turbulence within the cone.

A thesis by G. Ghisolfi entitled "Impianto di Postpolicondensazione di Polietilentereftalato" (1984–85) discloses an SSP reactor with nitrogen gas distributors located along the height of the reactor of which the bottom nitrogen distributor cools polyester chips to below a temperature at which oxidation can occur such as to 177° C. (351° F.). The chips would have to be subsequently cooled to lower temperatures to permit packaging. A presentation by A. Christel entitled "Advanced PET Bottle-to-Bottle Recycling" given at the Polyester 2000 World Congress discloses directly cooling recycled PET flakes at an outlet of a hopper of an SSP reactor with cold nitrogen.

Cooling the polymer chips after exiting the polycondensation reactor requires at least one cooling device, a gas mover such as a fan and a dust removal device. Either this equipment has to be located beneath the reactor or a pickup point and pneumatic conveying means has to be used to carry the hot chips to the top of a cooling section. Each approach involves additional equipment and building costs. Moreover, the former approach requires a taller overall SSP complex.

U.S. Pat. No. 4,255,542 B1 discloses an exothermic gas phase polymerization process in a fluidized bed reactor which is cooled by indirect cooling within the reactor. U.S. Pat. No. 3,227,527 B1 discloses a catalytic reactor vessel in which product gas permeates a truncated cone section at the base of the reactor to be cooled by quench liquid before exiting the reactor. These patents do not involve direct cooling of polymer solids in a packed bed with a gas.

Accordingly, an object of the present invention is to eliminate the additional cooling equipment required to cool the chips to a packaging temperature after exiting the SSP reactor. An additional object of the present invention is to consolidate the equipment used for cooling polymer solids and for introducing purge gas to the SSP reactor for the purging of impurities. An additional object of the present invention is to cool the polymer chips entering the dispensing section of the SSP reactor and therefore make the dispensing section a non-reactive region and to prevent the hot, tacky polymer chips from lumping when they are subjected to the consolidation pressure upon entering the frusto-conical portion of the dispensing section. An even further object of the present invention is to be able to eliminate the need for expensive dust removal equipment required with post-polycondensation reactor cooling equipment.

SUMMARY OF THE INVENTION

We have found that it is possible to cool the polymer chips from the SSP reactor temperature of 185° to 240° C. (365° to 464° F.) down to below 175° C. (347° C.) in a dispensing section of the polycondensation reactor. Moreover, we have found that we can cool the pellets to below 80° C. (176° F.) which is below the glass transition temperature for normal packaging and transport of PET chips. It was surprisingly learned that the heat transfer from gas to solids is rapid enough to allow the upper part of the dispensing section to be used for efficient cooling if particular mass ratios are used.

Accordingly, in one embodiment, the present invention relates to an apparatus for conducting a polymerization process. The apparatus comprises a reactor including a heated reactive section in which substantial polymerization of polymer solids therein occurs and a dispensing section for dispensing polymer solids from the reactor. The dispensing section defines an interior volume. A gas inlet connective with the interior volume of the dispensing section delivers gas to the dispensing section to heat or cool polymer solids traveling through the dispensing section. A gas outlet connective with the reactor proximate the dispensing section withdraws gas from the dispensing section.

In another embodiment, the present invention relates to a process for cooling polymer solids in a reactor comprising a reactive section and a dispensing section. The process comprises delivering polymer solids to the top of the reactive section. The polymer solids are polymerized as they flow downwardly in the reactive section so as to increase the molecular weight of the polymer solids. The polymer solids are dispensed from the dispensing section of the reactor. Gas is delivered to the dispensing section to flow countercurrently to the polymer solids and contact and heat or cool the polymer solids in the dispensing section. Some of the gas is withdrawn at an outlet proximate to the dispensing section.

In a further embodiment, the present invention relates to a process for adjusting the temperature of moving solids in a vessel by direct heat exchange with a gas. The process comprises delivering solids to a first section of the vessel. The solids are dispensed from a second section of the vessel. Gas is flowed through the vessel to effect direct heat exchange between the gas and the solids. A ratio of a mass flow rate of the gas multiplied by the heat capacity of the gas to a mass flow rate of solids multiplied by the heat capacity of the solids over a temperature range in the reactor is at least one.

Additional objects, embodiments and details of this invention can be obtained from the following detailed description of the invention.

DETAILED DESCRIPTION OF THE INVENTION

A detailed description of a preferred process and apparatus of the present invention is given in the context of a solid-state polycondensation (SSP) process. The SSP process can be used to increase the intrinsic viscosity of polyester, polyamide and polycarbonate components.

However, the present invention may be used with other types of polymerization processes in which cooling of the polymer solid product is necessary.

Polyester resins usable in the SSP process are products of polycondensation of aromatic bicarboxylic acid, particularly terephthalic acid or its esters with diols with 1 to 12 carbon atoms such as ethylene glycol, 1,4-dimethylolcyclohexane and 1,4-butanediol. Polyethylene terephthalate (PET) and polybutylene terephthalate are the preferred resins. Polyester resins usable in the SSP process also may include elastomeric polyester resins, including segments deriving from polyethylene glycol, and copolyesters containing up to 20% of units deriving from aromatic bicarboxylic acids different from terephthalic acid, such as isophthalic acid. PET resins to be subjected to SSP can contain a resin-upgrading additive to accelerate the SSP reaction. The preferred upgrading compounds are the dianhydrides of tetracarboxylic aromatic acids, and particularly pyromellitic dianhydride. The upgrading agent is generally used in a quantity of about 0.05 to 2% by weight. Conventional additives, like stabilizers, dyes, flame-retardants and nucleants can also be present in the resin. Polyester resins useful for upgrading in SSP processes can also be material produced from recycled containers which have been washed, shredded and dried. Typically, the recycled material is remelted and pelletized before being sent to the SSP process.

Polyamide resins usable in the process of the invention include polyamide 6 derived from caprolactam, polyamide 6,6 obtained from hexamethylenediamine and adipic acid, polyamide 11 obtained from aminoundecanoic acid, and polylaurilacetone copolyamides 6/10 and 10/12 and also polyamides of metaxylene diamine.

Figure 1:
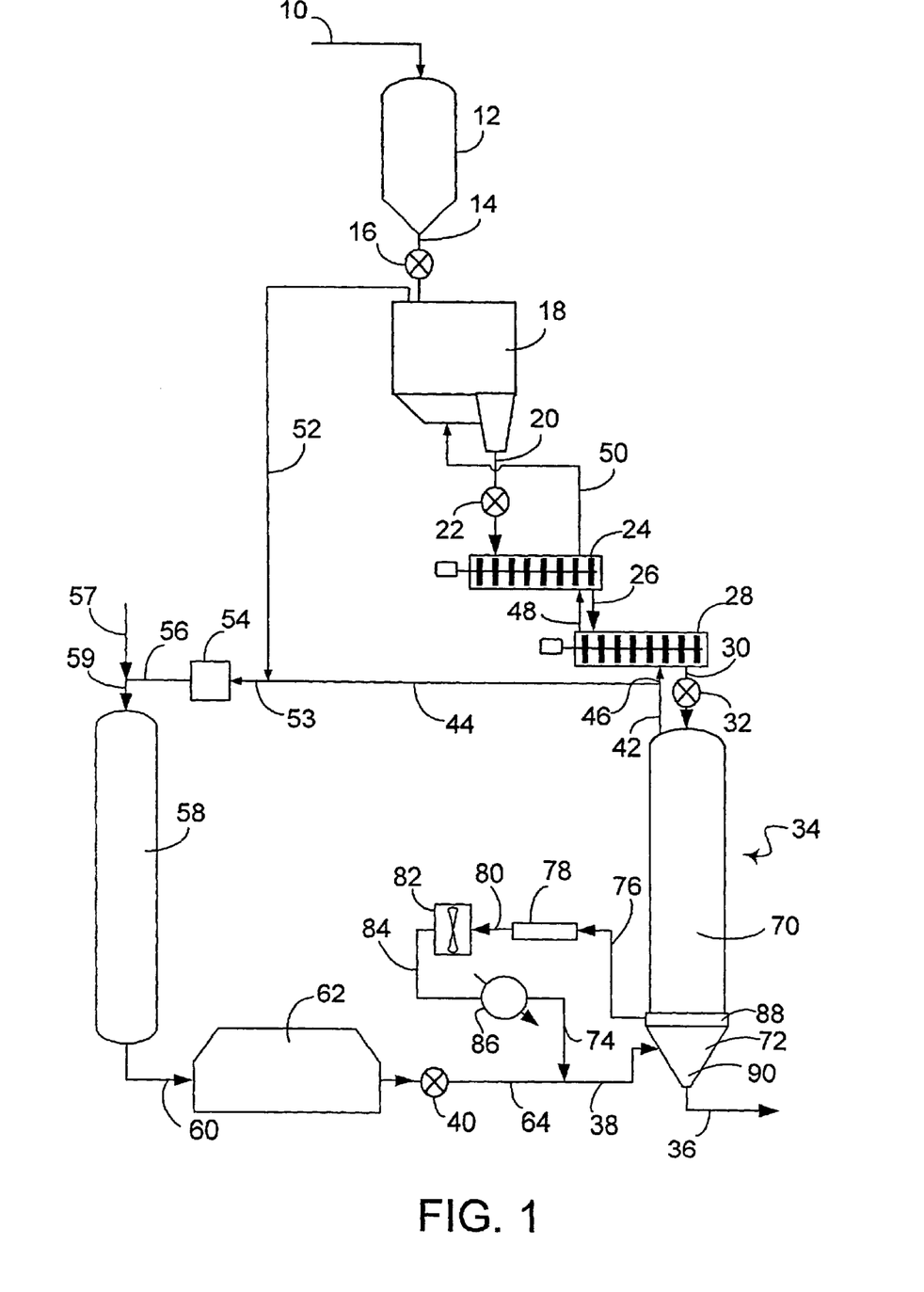
FIG. 1 is a schematic view of a polymerization flow scheme of the present invention.

FIG. 1 is an example of an SSP process for upgrading PET chips to which the present invention can be applied. However, the present invention can be applied to other polymerization processes in which the polymer solids must be cooled and/or heated. The SSP process in FIG. 1 can process up through 100 metric tons/day and typically 300 to 500 metric tons/day of polymer solids. The polyester SSP process comprises feeding amorphous, clear polyester chips having an intrinsic viscosity usually ranging from about 0.57 to 0.65 dl/g to a hopper 12 through a line 10. The intrinsic viscosity or molecular weight of the starting material is immaterial to the practice of the invention. Generally, the SSP process can be successfully performed with feeds across a wide range of values. For example, techniques are disclosed for using a starting material having a degree of polymerization as low as 2–40 by U.S. Pat. No. 5,540,868 B1, U.S. Pat. No. 5,633,018 B1 and U.S. Pat. No. 5,744,074 B1 which contemplate eventually undergoing SSP processing to raise the molecular weight sufficient to make useful resins. Also, the starting intrinsic viscosity in the case of post-consumer recycle material can be at levels of above 0.65 dl/g. The hopper 12 feeds the chips through a line 14 and a control valve 16 to a fluidized bed pre-crystallizer 18. The pre-crystallizer 18 operates at about 170° C. (338° F.) and 10.3 kPa gauge (1.5 psig) to achieve about 35% crystallinity of the polyester chips. The polyester chips are then fed from the pre-crystallizer 18 through a line 20 and a control valve 22 into a first crystallizer 24. If more capacity is necessary, a second crystallizer 28 may be utilized which the first crystallizer 24 feeds through a line 26. In the crystallizers 24, 28, the chips are eventually preheated or cooled in some cases to an SSP reaction temperature while being subjected to mechanical agitation to prevent the chips from sticking to each other. The chips leaving the crystallizer will exhibit about 45% crystallinity. Crystallizing PET granules prior to polycondensation prevents the granules from sticking during the SSP reaction.

The chips leaving the crystallizer(s) are then fed through a line 30 and a control valve 32 to a moving packed bed SSP reactor 34 operated suitably at 150° to 240° C. (302° to 464° F.) and preferably at 210° to 220° C. (410° to 428° F.) for PET. chips move by gravity through a heated reactive section 70 in which polymerization occurs for about 12 to 36 hours to yield crystalline, opaque pellets with an intrinsic viscosity of 0.75 dl/g or greater depending upon the application to which the polyester pellets will be put. The chips are withdrawn from the reactor 34 through a line 36.

An oxygen-free inert gas, typically nitrogen, purges the polymerization reactor, the crystallizers and the precrystallizer to remove impurities given off by the chips. The inert gas is delivered through a line 38 into the reactor 34. A gas line 42 removes inert gas with impurities from the reactor 34 and splits into a recycle line 44 and a crystallizer line 46. The crystallizer line 46 delivers the inert gas to the second crystallizer 28 and a line 48 delivers inert gas from the second crystallizer 28 to the first crystallizer 24. A line 50 delivers inert gas with impurities to the pre-crystallizer 18 and a line 52 delivers inert gas with impurities to join the recycle line 44. The inert gas recycled in a combined recycle line 53 is preferably at a temperature between 200° and 220° C. (392° and 428° F.).

The combined recycle line 53 runs the inert gas with impurities through a filter 54. After the recycled inert gaseous stream is filtered, air is injected by a line 57 into a line 56 exiting the filter 54. The air/inert gaseous mixture is carried by a line 59 through a heater (not shown), if necessary to achieve the desired oxidation reaction temperature, into an oxidation reactor 58 where the organic impurities are combusted by circulating the stream over a catalyst bed including an oxidation catalyst. Oxygen is injected by the line 57 in substantially stoichiometric quantities to assure the complete combustion of the organic impurities in the oxidation reactor 58. Preferably no greater than about 10 ppm of oxygen is present in the effluent of the reactor 58. The oxidation reactor 58 can be operated with these conversions at temperatures ranging from 200° to 350° C. (392° to 662° F.) depending on the catalyst. A line 60 withdraws the effluent from the oxidation reactor 58 that contains only nitrogen, carbon dioxide, water and traces of oxygen. The carbon dioxide content stabilizes at a certain level due to the losses through the SSP plant and acts like an inert gas due to its chemical inertia. The exiting gaseous stream in the line 60 may be circulated through a heat exchanger (not shown) for heat recovery or to condense and dispose of part of the water by cooling the oxidation reactor effluent. No optional condensation collection equipment is shown in the drawings. The gaseous stream is delivered by the line 60 to a dryer 62 preferably operating at 200° C. (392° F.). The dryer 62 preferably contains molecular sieves for adsorbing the water. The effluent of the dryer 62 is transported through a line 64 after having been filtered (not shown) of possible particles deriving from the molecular sieves. The line 64 is combined with a line 74 to form the line 38. The line 38 recycles the gaseous stream to the reactor 34. The regeneration of the molecular sieves bed is performed according to known methods, operating for example on a closed circuit with a hot nitrogen stream (not shown).

The reactor 34 includes the heated cylindrical active or reactive section 70 that is preferably heated by a circulating oil jacket. The reactor 34 also includes a dispensing or inactive section 72 comprising a cylindrical disengaging portion 88 and an inverted, generally frusto-conical consolidating portion 90. The inert gas, preferably nitrogen, enters an interior volume 91 defined by the dispensing section 72 through the line 38. The inert gas directly cools the polymer solids in the dispensing section down to below 175° C. (347° F.), suitably below 100° C. (212° F.), preferably down to below 80° C. (176° F.) and perhaps to below 50° C. (122° F.) if desired. The cooled polymer solids can then be transported to storage through the line 36 without the need for any additional cooling equipment. A portion of the inert gas is withdrawn from the reactor 34 proximate to the dispensing section 72 by a line 76 and enters a dust removal device 78. Proximate to the dispensing section 72 means, the withdrawal point of the line 76 is either in the dispensing section 72 or not above the lower quarter of the reactive section 70 and preferably not above the lower tenth of the reactive section 70. The de-dusted gas is transported from the dust removal device 78 through a line 80 and is moved by a fan 82 through a line 84 to a cooler 86 and is combined with the line 64 to be recycled to the dispensing section 72 of the reactor 34 by the line 38.

Figure 2:
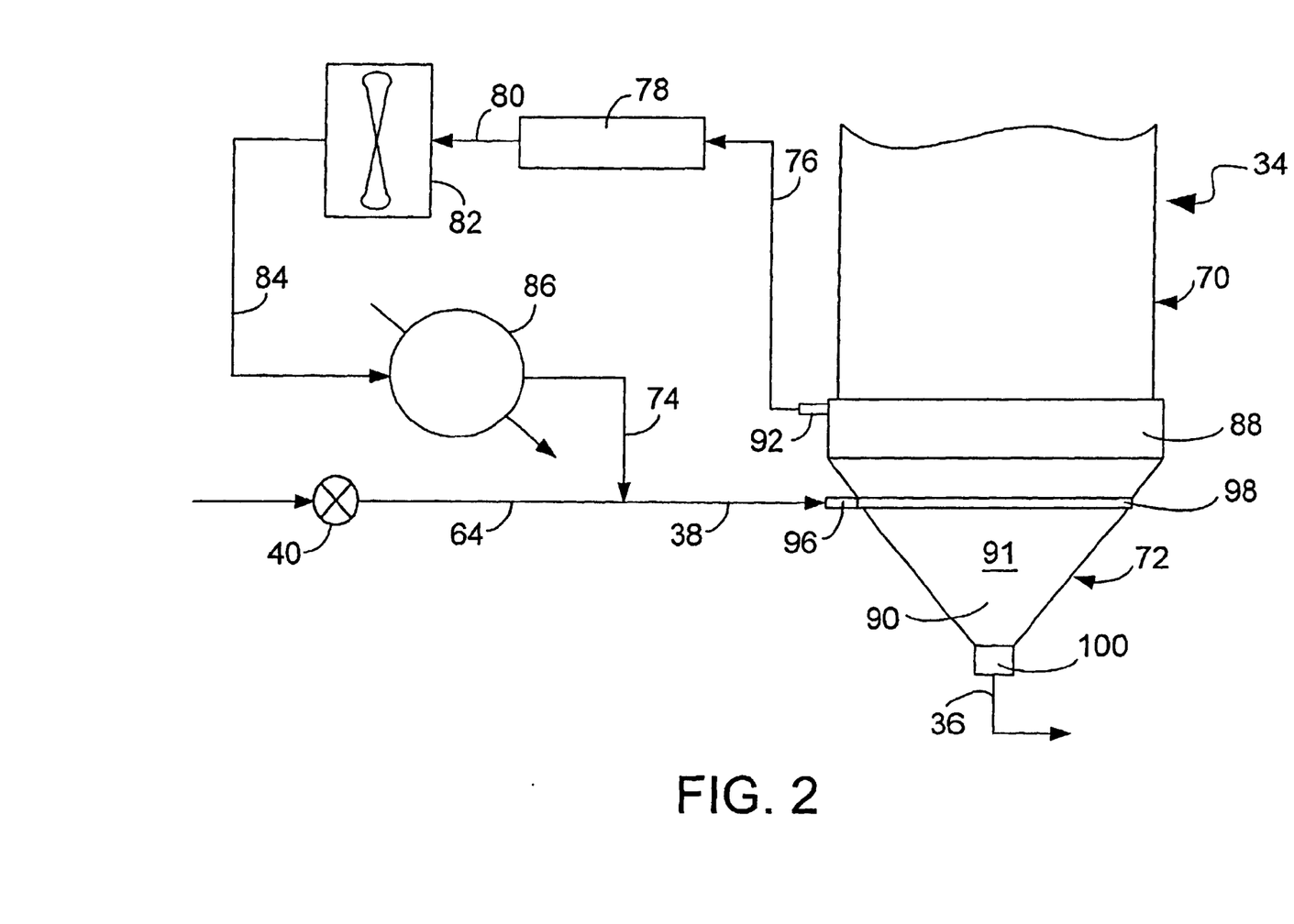
FIG. 2 is a partial, enlarged view of a reactor dispensing section and cooling apparatus of FIG. 1.

The cooling apparatus is illustrated in more detail in FIG. 2. FIG. 2 gives a partial view of the reactor 34. The cylindrical disengaging portion 88 has an inner diameter that is greater than the inner diameter of the reactive section 70. Gas is withdrawn from the reactor 34 through at least one outlet nozzle 92 through the line 76 for recycling. The outlet nozzle is preferably disposed in the disengaging portion 88 of the dispensing section 72. Although only one outlet nozzle 92 is shown in FIG. 2, a plurality of the radially disposed outlet nozzles 92 is contemplated. The remaining gas will ascend through the reactive section 70 of the reactor 34 and purge impurities stripped from the developing polymer. Because the polymer solids exchange heat with the cooling gas, the gas now withdrawn through the outlet nozzles 92 and that ascends through the reactive section 70 will have a temperature that is not substantially different from polymer solids in the reactive section 70 of the reactor 34. Therefore, the gas that ascends into the reactive section 70 will not impede the polycondensation reaction by cooling.

The dust removal device 78 is either a dust-removing cyclone or a filter, which can operate continuously. The dust removed by the cooling gas flowing through the moving packed bed of polymer solids is low because it is only taken from the top-most layer of the polymer. Therefore, the cooling of circulating gas can be performed with a simple filter or dust removal cyclone which is more compact and less expensive than the equipment required to remove dust from a conventional fluidized bed. The fan 82 pumps cooling gas from the dust removal device 78 through the lines 80 and 84 to the cooler 86. The cooler 86 removes the heat gained by the gas in the dispensing section 72 by indirect heat exchange with a cooling medium such as water. The line 74 combines the cooled gas from the cooler 86 with recycled purge gas in the line 64 to form the line 38. The flow rate of the gas removed proximate to the dispensing section 72 may be set by a variable capacity characteristic of the fan or by a control valve (not shown) in FIG. 2. Thus, the excess inert gas, equal to the flow of gas from the dryer 62 in the line 64, ascends into the reactive section 70 from the dispensing section 72. The flow of gas through the line 64 is regulated by a control valve 40. It is preferred that the control valve 40 be regulated to ensure that the mass flow ratio of gas to solids be less than 0.6, taking into account the gas removed from the reactor for cooling and recirculation. The temperature of the ascending and withdrawn gas is set by the temperature of the gas fed to the dispensing section 72 plus the temperature rise caused by the removal of heat from the polymer solids.

The variable capacity fan 82 or control valve regulates the temperature of the polymer solids exiting the outlet 100 of the reactor 34. For example, if the fan 82 or the control valve is set to allow a very low flow rate or no flow at all, the temperature of the gas in the line 38 will be higher because it would not be mixed with as much cooled gas from the line 74. Hence, if desired, the polymer solids exiting the outlet 100 will not be cooled as much and can be sent directly to a molding process such as injection molding which requires the polymer solids to be at a temperature above the glass transition temperature for moldability. Moreover, the temperature of solids is exiting the reactor may be regulated based on the flow rate of coolant circulated through the cooler 86, without affecting the flow rate of gas withdrawn through the outlet nozzle 92 and recirculated through an inlet nozzle 96.

The inlet nozzle 96 distributes the gas to a ring distributor 98 that is an annulus around the inside diameter of the dispensing section 72. The ring distributor 98 has openings distributed radially around its circumference for distributing gas into the dispensing section 72. It is preferred that the distributor not extend into the reactor 34 to avoid obstructing the flow of polymer solids.

Figure 3:
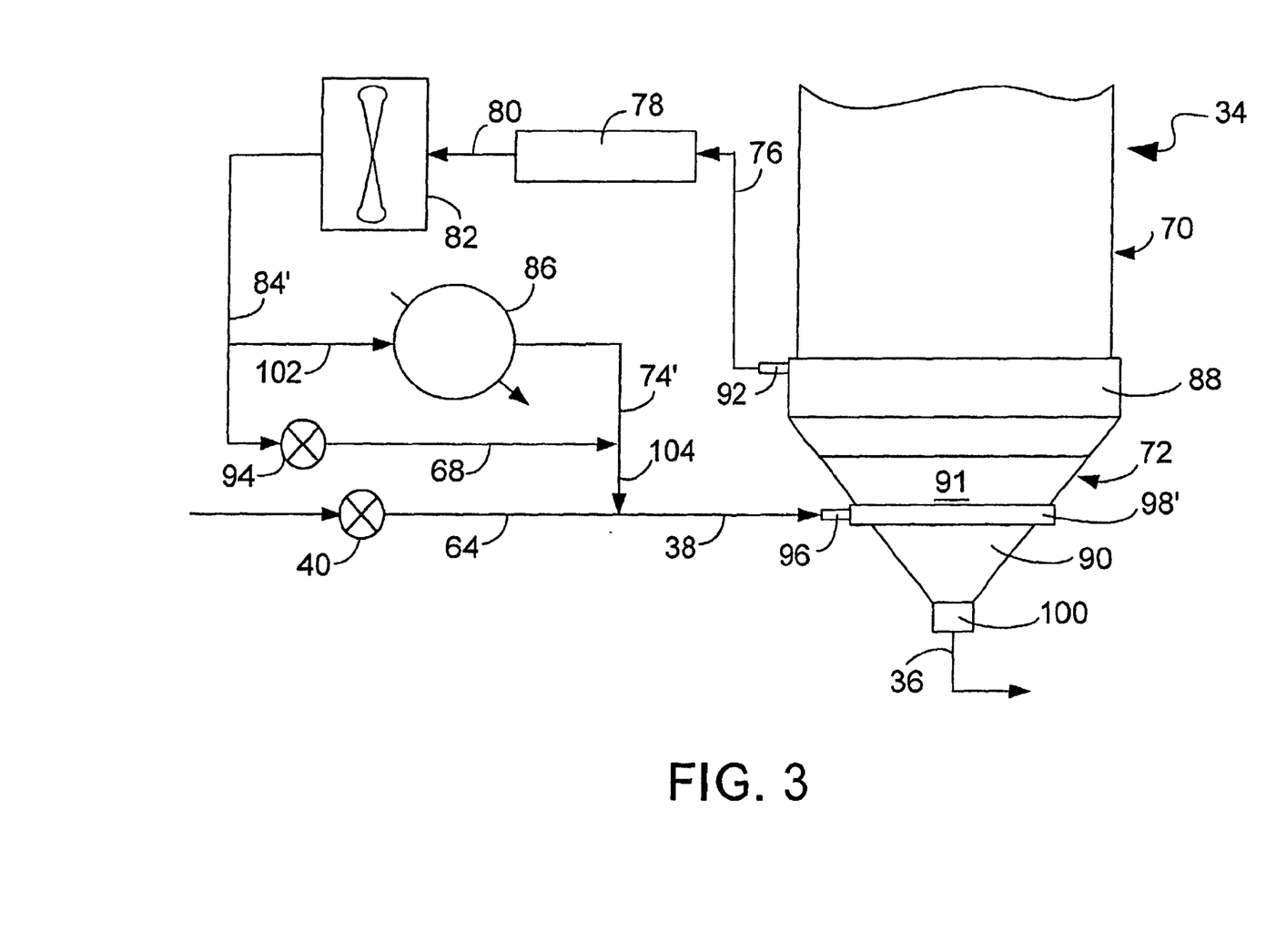
FIG. 3 is a partial, enlarged view of an alternative reactor dispensing section and cooling apparatus of FIG. 1.

FIG. 3 is similar to FIG. 2 with the exception that it has a different device for injecting the inert gas into the dispensing section 72 and that it includes a control valve 94 in a bypass line 68. The elements in FIG. 3 that differ from corresponding elements in FIG. 2 are designated with a prime symbol ('). Otherwise, the elements have essentially the same function and structure in FIG. 3 as in FIG. 2. A distributor 98' in FIG. 3 injects cooling gas around the periphery of the dispensing section 72 of the reactor 34. The distributor 98' has a closed outer surface but the inner surface is contiguous with the wall of the dispensing section 72 and includes perforations for injecting the cooling gas into the dispensing section 72. The perforations in the distributor 98' may be defined by slots or bands or may comprise a profile wire screen. The distributor 98' does not extend substantially into the reactor 34.

Another difference from FIG. 2 is that the control valve 94 in FIG. 3 is used to control the temperature of the polymer solids leaving the outlet 100. A line 84' splits into a line 102 that goes to the cooler 86 and the line 68 that bypasses the cooler 86 via the control valve 94 and joins the effluent of the cooler 86 in a line 74'. A combined line 104 joins the line 64 from the dryer 62 to form the line 38 in communication with the inlet nozzle 96. The amount of gas in the line 68 that bypasses the cooler 86 regulated by the control valve 94 affects the temperature of the gas in the line 104 which affects the temperature in the line 38 which contacts the polymer solids. If the exiting polymer solids are too cool, the control valve 94 will be opened more so less of the recirculated gas will be cooled in the cooler 86 and vice versa. The control valve 94 can be hooked up to a temperature indicator controller (not shown) which could control the operation of the control valve 94 automatically based on desired temperature of the solids exiting the outlet 100. The flow scheme in FIG. 3 is advantageous because the temperature of polymer solids can be controlled while keeping the gas withdrawn through the outlet nozzle 92 and recirculated through the inlet nozzle 96 constant. Hence, the flow rate of gas that ascends through the reactive section 70 to purge the impurities will not be affected.

Other types of cooling gas injection and collection equipment may be used according to the teaching of the present invention. Moreover, it is contemplated that warm inert gas could be fed to the reactor for heating the solids if desired with the same equipment with the exception of using a heater instead of the cooler 86. For example, this flow scheme could be used to heat the polymer solids to make it suitable for injection molding after polycondensation.

It is preferable that the local actual velocity of the cooling gas in all sections of the dispensing section not exceed 75% of the minimum fluidization velocity of polymer solids. This preference is primarily to avoid agitation of the solids which may lead to flow mal-distribution and subsequent loss of cooling efficiency. Secondly, fluidization of the polymer solids may upset the mass flow of solids through disturbances in the bed which could lead to wider residence time distribution and variability in intrinsic viscosity.

In order to ensure temperature uniformity of the polymer solids, it is important that a thermal mass ratio "R" be greater than or equal to 1. The thermal mass ratio is as follows:

$$R = \frac{\text{upward mass flow of gas} \times \text{heat capacity of gas}}{\text{downward mass flow of solids} \times \text{heat capacity of solids}} \quad (1)$$

With $R \geq 1$ and plugging in the heat capacities of the inert gas and the solids, equation (1) can be reworked as follows:

$$\frac{\text{upward mass flow rate for gas}}{\text{downward mass flow rate for solids}} \geq \frac{\text{heat capacity of solids}}{\text{heat capacity of gas}} \quad (2)$$

With nitrogen as the inert gas and polyester, polyamide or a polycarbonate as the solids, a suitable ratio of upward mass flow rate for gas to downward mass flow rate for solids is 1.6 and 1.9 is a preferred ratio which accounts for any flow nonuniformity.

Cooling is accomplished efficiently in the dispensing section 72 of the reactor 34 without wasting extra space or using additional equipment. Typically, the cooling equipment is below the reactor 34. By removing the conventional cooling equipment, capital cost is reduced and the overall height of the SSP complex is reduced. Alternatively, no pickup point is required to convey hot polymer solids to a cooling zone which is not situated below the polycondensation reactor.

Solid flow mechanics indicate that through the cylindrical active section of the reactor 34, the polymer solids are in plug flow. However, when the polymer solids enter the frusto-conical portion 90 of the dispensing section 72, they begin to flow non-uniformly to some extent. By cooling the polymer solids to below the reaction temperature, the dispensing section ceases to be an active section and the solid-to-solid variation in intrinsic viscosity or molecular weight is lower because the effective residence time along the solids has a tighter distribution. Additionally, when the solids transition from the cylindrical reactive section 70 to the frusto-conical portion 90 of the dispensing section 72 and the polymer solids are subjected to a consolidation pressure, the polymer solids are prevented from sticking together which can cause lumping of the solids and flow interruption. By maintaining the transition between the reactive section 70 and dispensing section 72 of the polycondensation reactor at a lower temperature, the stickiness can be reduced resulting in ease of operation. Therefore, materials more prone to sticking can be processed by cooling in the dispensing section. Moreover, the temperature of the reactor 34 can be increased to cause higher reactivity of the polymer with a concomitant higher production rate and increase in intrinsic viscosity or molecular weight.

The high thermal conductivity of polymer resins such as PET is such that the inert gas ascending above the dispensing section is closely approaching the temperature of the downwardly flowing polymer solids. If this ascending gas from the dispensing section were too cool, it would have to be subjected to intermediate heating to prevent the cooler gas from negatively impacting the polycondensation reaction. However, the efficient recuperation of what would otherwise be waste heat from the polymer solids allows the excess cooling gas to flow through the active section of the polycondensation reactor and serve to purge the polymer solids of impurities. Hence, only one inert gas stream must be fed to the reactor which serves both cooling and purging functions. Additionally, the polymer solids in the dispensing section serve to distribute the gas across the cross-section of the reactor, thereby obviating the need for distribution equipment which is more expensive and can obstruct the flow of solids.

The following example is given to illustrate and not to limit the invention.

EXAMPLE

Figure 4:
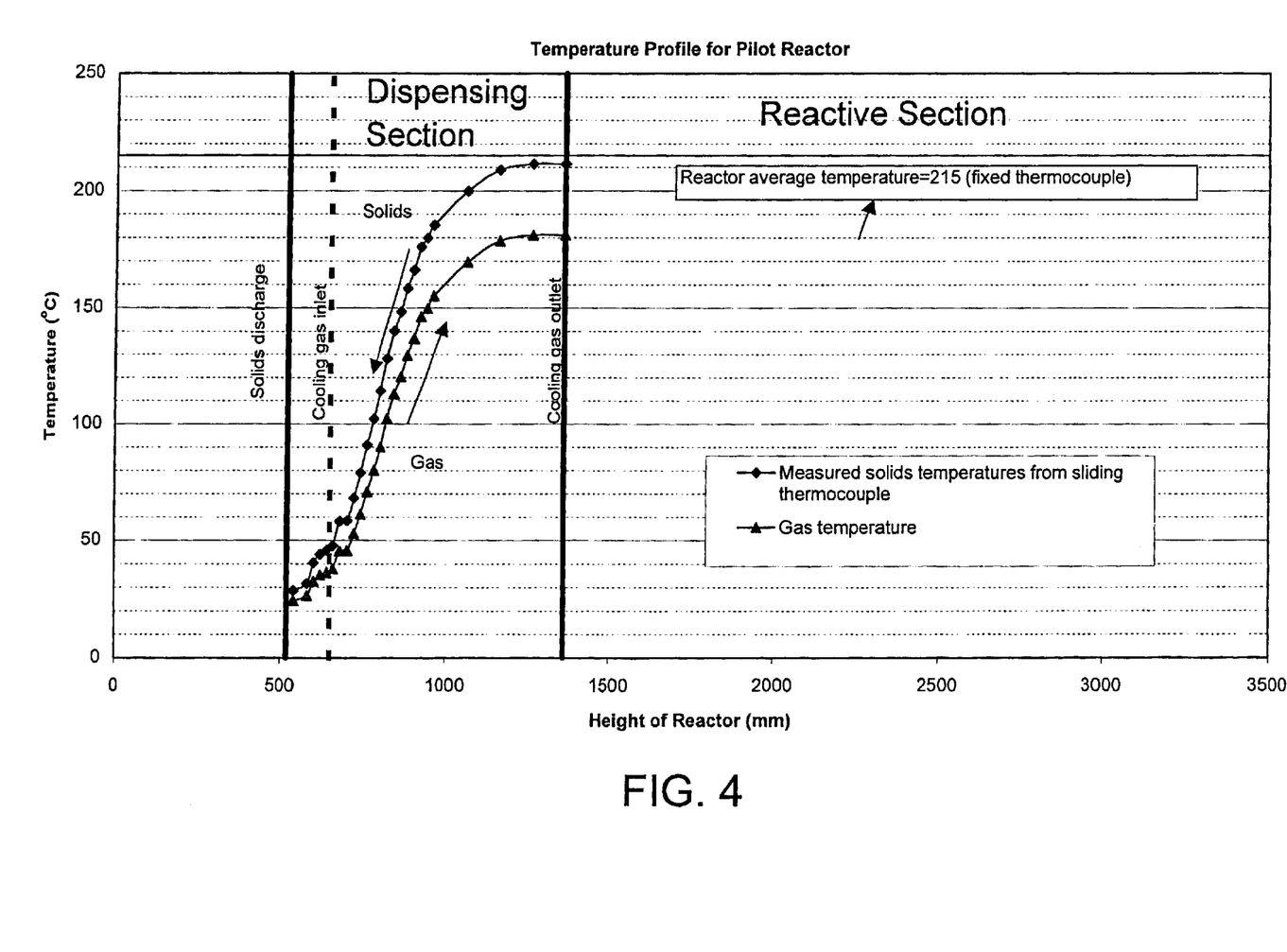
FIG. 4 plots a temperature profile through the dispensing section of a reactor.

The dispensing section of the present invention was tested in a pilot reactor of 618 mm inside diameter. Nitrogen cooling gas was injected radially at a point in the frusto-conical portion of the dispensing section corresponding to a gas velocity of approximately 0.6 m/sec. The cooling gas was withdrawn at the top of the frusto-conical portion of the dispensing section. PET copolymer having an intrinsic viscosity of 0.6 dl/g was raised to 0.8 dl/g in the reactor and the product leaving the frusto-conical portion of the dispensing section had a temperature of approximately 45° C. (113° F.). The mass flow rate ratio of gas to solids in the dispensing section was 2.0 and the gas was injected at approximately 42° C. (108° F.). Pellet temperatures were measured by sliding a thermocouple approximately at centerline and the results were that the heat transfer was accomplished at slightly higher than 1 reactor diameter. A plot of the temperature profile is shown in FIG. 4. Because it was believed that the thermocouple was in contact with the PET pellets, the temperature of the gas was estimated by a heat balance.

The dust in the stream leaving the reactor was collected by a filter and amounted to less than 5 ppmw of the gas stream. A cooling gas stream with such a low dust concentration is suitably moved by a normal gas mover.

What is claimed is:

1. An apparatus for conducting a polymerization process, said apparatus comprising a reactor including:

a heated reactive section in which substantial polymerization of polymer solids therein occurs;

a dispensing section for dispensing polymer solids from said reactor, said dispensing section defining an interior volume;

a gas inlet connective with the interior volume of the dispensing section for delivering gas to the dispensing section to heat or cool polymer solids traveling through the dispensing section; and a gas outlet connective with the reactor proximate the dispensing section for withdrawing gas from the dispensing section.

2. The apparatus of claim 1 wherein the dispensing section includes a frusto-conical portion with a small diameter opening out of which the polymer solids exit the reactor.

3. The apparatus of claim 2 wherein the reactive section is cylindrical and which is connective with a large diameter opening of the dispensing section.

4. The apparatus of claim 1 wherein a gas cooler is in communication with the gas inlet.

5. The apparatus of claim 1 wherein a gas mover is in communication with the gas inlet.

6. The apparatus of claim 1 wherein a dust removing device is in communication with the gas outlet.

7. The apparatus of claim 1 wherein a variable capacity gas mover or a control valve regulates the flow rate of gas withdrawn from the gas outlet.

8. The apparatus of claim 4 wherein the gas cooler communicates with a purge line that delivers gas that has been withdrawn from the reactive section of the reactor to the gas inlet.

9. The apparatus of claim 8 wherein said purge line includes a control valve upstream of a communication with the gas cooler.

10. The apparatus of claim 1 wherein the gas inlet includes an annular distributor with openings in communication with, but not substantially extending into, the interior volume of the dispensing section of the reactor.

11. A process for cooling polymer solids in a reactor comprising a reactive section and a dispensing section comprising:
    delivering polymer solids to the top of said reactive section;
    polymerizing said polymer solids as they flow downwardly in the reactive section so as to increase the molecular weight of the polymer solids;
    dispensing said polymer solids from said dispensing section of said reactor;
    delivering gas to said dispensing section to flow countercurrently to said polymer solids and contact and heat or cool the polymer solids in said dispensing section; and
    withdrawing some of the gas at an outlet proximate to said dispensing section.

12. The process of claim 11 including cooling said gas withdrawn proximate to said dispensing section.

13. The process of claim 12 wherein the rest of the gas not withdrawn from said outlet purges impurities from the polymer solids in the reactive section and is withdrawn from the reactive section.

14. The process of claim 13 wherein gas withdrawn from the reactive section is combined with gas withdrawn proximate to said dispensing section after gas withdrawn proximate to said dispensing section is cooled.

15. The process of claim 11 wherein the ratio of a mass flow rate of the gas multiplied by the heat capacity of the gas to a mass flow rate of polymer solids multiplied by the heat capacity of the polymer solids over a temperature range in the reactor is at least one.

16. The process of claim 14 wherein the gas withdrawn from the reactive section has impurities therein oxidized and is dried before it is combined with gas withdrawn from said dispensing section.

17. The process of claim 12 wherein the gas withdrawn proximate to the dispensing section is filtered before it is cooled.

18. The process of claim 12 wherein the flow rate or temperature of gas recycled to the dispensing section is regulated to achieve a desired temperature of polymer solids in the dispensing section.

19. The process of claim 11 wherein said temperature of said polymer solids leaving said dispensing section is below 150° C. (302° F.).

20. A process for adjusting the temperature of moving solids in a vessel by direct heat exchange with a gas comprising:
    delivering solids to a first section of said vessel;
    dispensing said solids from a second section of said vessel; and
    flowing gas through said vessel to effect direct heat exchange between said gas and said solids wherein a ratio of a mass flow rate of the gas multiplied by the heat capacity of the gas to a mass flow rate of solids multiplied by the heat capacity of the solids over a temperature range in the reactor is at least one.

* * * * *